United States Patent
Ono et al.

(10) Patent No.: US 6,468,627 B2
(45) Date of Patent: Oct. 22, 2002

(54) POLYESTER FILM FOR MAGNETIC RECORDING MEDIUM, AND MAGNETIC RECORDING TAPE

(75) Inventors: Masaaki Ono, Otsu; Katsuya Okamoto, Hirakata; Toshihiro Tsuzuki, Kyoto; Tsutomu Morimoto, Otsu, all of (JP)

(73) Assignee: Toray Industries, Inc., Tokyo (JP)

( * ) Notice: Subject to any disclaimer, the term of this patent is extended or adjusted under 35 U.S.C. 154(b) by 118 days.

(21) Appl. No.: 09/739,012

(22) Filed: Dec. 19, 2000

(65) Prior Publication Data

US 2001/0006743 A1 Jul. 5, 2001

(30) Foreign Application Priority Data

Dec. 24, 1999 (JP) ............................................. 11-366403

(51) Int. Cl.$^7$ ................................................. G11B 5/733
(52) U.S. Cl. ........................ 428/141; 428/323; 428/480; 428/674 TS; 428/694 TB; 428/694 SL; 428/694 SG
(58) Field of Search .................................. 428/141, 323, 428/480, 694 TS, 694 TB, 694 SL, 694 SG, 900

(56) References Cited

U.S. PATENT DOCUMENTS 5,908,684 A    6/1999    Matsumura et al. ........ 428/141

FOREIGN PATENT DOCUMENTS

| JP | 57-195321 A | 12/1982 |
|----|-------------|---------|
| JP | 62-30105 B  | 6/1987  |
| JP | 1-26338 B   | 5/1989  |
| JP | 9-164644 A  | 6/1997  |
| JP | 10-172127 A | 6/1998  |
| JP | 10-172127   | 6/1998  |
| JP | 10-172128 A | 6/1998  |
| JP | 10-261217 A | 9/1998  |
| JP | 11-16145 A  | 1/1999  |
| JP | 11-91053 A  | 4/1999  |
| JP | 11-170466 A | 6/1999  |

*Primary Examiner*—Stevan A. Resan
(74) *Attorney, Agent, or Firm*—Kubovcik & Kubovcik

(57) ABSTRACT

Disclosed is a base film that has excellent electromagnetic conversion property over the entire length from a roll core portion to a surface portion of the film product and that is suitable for the production of digital videotapes with reduced dropouts. A polyester film for a magnetic recording medium includes at least a polyester layer A and a polyester layer B laminated. A center-line surface average roughness (SRa value) of a layer A-side surface of the film is 2 nm to 4 nm, and a ten-point average surface roughness (SRz value) of the layer A-side surface is 10 nm to 40 nm. The layer B contains a fine particle α whose average particle size is at least 50 nm and less than 250 nm, and a fine particle β whose average particle size is at least 250 nm and less than 500 nm. The content of the fine particle α in the layer B is 0.1 wt. % to 1.0 wt. %. The content of the fine particle β in the layer B is 0.01 wt. % to 0.10 wt. %. A magnetic recording tape is formed by providing a ferromagnetic metal thin film on a layer A-side surface of the polyester film.

11 Claims, No Drawings

POLYESTER FILM FOR MAGNETIC RECORDING MEDIUM, AND MAGNETIC RECORDING TAPE

BACKGROUND OF THE INVENTION

The invention relates to a polyester film and, more particularly, to a polyester film suitable as a base film for a ferromagnetic metal thin film type magnetic recording medium for recording digital data, such as a digital video cassette tape, and the like.

A consumer digital videotape commercialized in 1995 is formed by, for example, providing a metal magnetic thin film of Co on a base film through vacuum evaporation and by coating a surface thereof with a diamond-like carbon film. This videotape has good durability while having a further smoothed surface property in comparison with the ME (metal evaporated) tape for the Hi8.

Base films used for the videotape are, for example, as follows: (1) a polyester film formed by a polyester film, a discontinuous coating adhered to at least one side of the film, and a fine particle present in the coating and on a surface of the coating (e.g., JP-B-62-30105); (2) a co-extruded film formed by laminating a layer A made of a thermoplastic resin and a layer B made of a thermoplastic resin containing a fine particle (e.g., JP-B-1-26338); (3) a smooth polyester film in which a coating layer is formed mainly from a lubricant on a non-magnetic surface-side surface (e.g., JP-A-57-195321). The base films have further reduced roughness of a metal magnetic film-formed surface, compared with the base films for the Hi8 ME tape.

However, the magnetic recording tapes produced by using these base films have drawbacks, such as poor handling characteristics, great variations in the surface undulation of the tape magnetic surface, increased dropouts (DOs) due to the effects of foreign materials that deposit on a cooling can during a vacuum evaporation process, etc.

As a polyester film for a magnetic recording medium that overcomes the aforementioned problems, and that forms a magnetic recording tape with good electromagnetic conversion property, and that has good handling characteristic and is suitable for mass production, JP-A-10-172127 discloses a polyester film for a magnetic recording medium wherein the SRa value of a side surface A of the polyester film is 2 nm to 4 nm, and the SRz value thereof is 10 nm to 40 nm, and the SRa value of the other side surface B is 5 nm to 15 nm, and the SRz value thereof is 50 nm to 250 nm, and the outer side of the surface B is not provided with a lubricating layer formed by application, and the number of projections as high as or higher than 540 nm is 2 to 20 (100 cm$^2$), and wherein a ferromagnetic metal thin film is provided on the outer side of the surface A for use.

Consumer digital videotapes presently enjoy great popularity, and it is demanded that more consumer digital videotapes be put on the market. Therefore, in order to allow production of a greater quantity of digital videotapes through a single vapor deposition process, the base film length has been increased, from the conventional lengths of 10,000 m or less to lengths of 12,000 m or greater, and to lengths of 15,000 m or greater.

Along with such situational changes, it has become evident that if a base film roll having a winding length exceeding 10,000 m is formed by winding a base film disclosed in the aforementioned JP-A-10-172127, and is used to produce consumer digital videotapes, digital videotapes produced from a base film in a winding core portion close to the bobbin of the film roll have poor electromagnetic conversion property and therefore dropouts increase.

SUMMARY OF THE INVENTION

Accordingly, it is an object of the invention to provide a polyester film for a magnetic recording medium that allows production of digital videotapes with good electromagnetic conversion property and reduced dropouts from any portion of the entire length of the film rolled, that is, the entire length from a winding core portion to a surface portion of the film roll, even if the film length of the roll exceeds 10,000 m.

To achieve this and other objects, the invention is constructed as follows.

A polyester film for a magnetic recording medium, comprising at least a polyester layer A and a polyester layer B laminated, wherein a center-line surface average roughness (SRa value) of a layer A-side surface of the film is 2 nm to 4 nm, and a ten-point average surface roughness (SRz value) of the layer A-side surface is 10 nm to 40 nm, and the layer B contains a fine particle α whose average particle size is at least 50 nm and less than 250 nm, and a fine particle β whose average particle size is at least 250 nm and less than 500 nm, and a content of the fine particle α in the layer B is 0.1 wt. % to 1 wt. %, and a content of the fine particle β in the layer B is 0.01 wt. % to 0.1 wt. %. A magnetic recording tape is formed by providing a ferromagnetic metal thin film on a layer A-side surface of the polyester film.

DETAILED DESCRIPTION OF PREFERRED EMBODIMENTS

A polyester film in accordance with the invention is formed by laminating at least a polyester layer A and a polyester layer B. The polyester film in accordance with the invention is provided with a ferromagnetic metal thin film formed on a layer A-side surface, and is used as a magnetic recording medium.

The polyester in the invention may be a polyester that forms a high-strength film through molecular orientation. The polyester is preferably a polyethylene terephthalate or a polyethylene-2, 6-naphthalate. If at least 80% of the components of the polyester is ethylene terephthalate or ethylene naphthalate, other components may also be copolymerized. Examples of the polyester copolymer components other than ethylene terephthalate and ethylene naphthalate include diol components, such as diethylene glycol, propylene glycol, neopentyl glycol, polyethylene glycol, p-xylylene glycol, 1,4-cyclohexane dimethanol, etc., dicarboxylic acid components, such as adipic acid, sebacic acid, phthalic acid, isophthalic acid, 5-sodium sulfoisophthalic acid, etc., multifunctional dicarboxylic acid components, such as trimellitic acid, pyromellitic acid, etc., p-oxyethoxybenzoic acid, etc.

The polyester may further contain at least one of alkali metal salt derivatives of sulfonic acids that are not reactive with polyester, polyalkylene glycols that are substantially insoluble in polyester, etc., in an amount that is not greater than about 5 wt. %.

The center-line surface average roughness (SRa value) of the layer A-side surface of the polyester film in accordance with the invention is 2 nm to 4 nm and, preferably, 2 nm to 3 nm. The ten-point average surface roughness of the layer A-side surface (SRz value) is 10 nm to 40 nm and, preferably, 20 nm to 40 nm.

If the SRa value is less than 2 nm, the ferromagnetic metal thin film formed on the surface A by vacuum evaporation becomes excessively smooth so that the ferromagnetic metal thin film of the videotape is abraded by a video head during the recording and reproduction in a digital video recorder. Thus, the SRa value less than 2 nm is not preferable. If the SRa value is greater than 4 nm, the ferromagnetic metal thin film becomes excessively rough so that the output characteristics of the videotape deteriorate. Thus, the SRa value exceeding 4 nm is not preferable.

If the SRz value is less than 10 nm, the ferromagnetic metal thin film becomes excessively smooth so that the durability of the videotape is decreased by recording and reproduction being repeated many times in a digital videotape recorder. Thus, the SRz value less than 10 nm is not preferable. If the SRz value is greater than 40 nm, the ferromagnetic metal thin film becomes excessively rough so that the number of small videotape DOs increases. Thus, the SRz value exceeding 40 nm is not preferable.

It is preferable that the layer A-side surface of the polyester film be provided with a coating layer formed from an organic compound containing 0.5 wt. % to 12 wt. % of a fine particle having an average particle size of 5 nm to 30 nm. As the fine particle, silica, calcium carbonate, alumina, polyacrylic acid spherical particles and polystyrene spherical particles may be preferably used. The average particle size of the fine particle is more preferably 8 nm to 30 nm. The content of the fine particle is more preferably 0.6 wt. % to 10 wt. %. Preferably used as the organic compound may be polarized macromolecules, such as polyvinyl alcohol, gum traganth, casein, gelatin, cellulose derivatives, water-soluble polyester, polyurethane, etc., and blends thereof.

In a case where the layer A-side surface of the polyester film is provided with the applied layer, the SRa value and the SRz value are values measured, with the applied layer formed.

Furthermore, in order to improve the slippage property of the magnetic recording tape with respect to the magnetic head and further increase durability, it is preferable that 0.01 wt. % to 1 wt. % of a fine particle having an average particle size of 30 nm to 150 nm be contained in a polyester layer which forms the layer A, and that projections be formed on the layer A-side surface. A more preferable average particle size of the fine particle is 40 nm to 100 nm. A more preferable content of the fine particle is 0.02 wt. % to 0.8 wt. %.

The SRa value and the SRz value of the layer A-side surface may be adjusted by adjusting the fine particle and other components in the coating layer, or the fine particle added to the layer A.

An outer side surface of the layer B of the polyester film has surface projections that are formed from fine particles $\alpha$, $\beta$ present in the layer B. The fine particle $\alpha$ has an average particle size of at least 50 nm and less than 250 nm. The fine particle $\beta$ has an average particle size of at least 250 nm and less than 500 nm. The content of the fine particle $\alpha$ in the layer B is 0.1 wt. % to 1 wt. %. The content of the fine particle $\beta$ therein is 0.01 wt. % to 0.1 wt. %.

The SRa value of a layer B-side surface is preferably 10 nm to 25 nm and, more preferably, 15 nm to 22 nm. The SRz value of the layer B-side surface is preferably 200 nm to 450 nm and, more preferably, 250 nm to 350 nm.

If the average particle size of the fine particle $\beta$ is less than 250 nm or the content of the fine particle $\beta$ is less than 0.01 wt. %, the film surface becomes excessively smooth so that during production of the polyester film and, particularly, when a film is slit into a predetermined width, and is wound into the form of a roll, and is thus prepared as a product during a slit process using a slitter after the film formation, there is a tendency of forming wrinkling in the film and failing to wind the film into the form of a roll. Thus, neither the average particle size of the fine particle $\beta$ being less than 250 nm nor the content of the fine particle $\beta$ being less than 0.01 wt. % is preferable. There is a similar tendency if the SRz value of the layer B-side surface is less than 200 nm. If the average particle size of the fine particle $\beta$ exceeds 500 nm or the content of the fine particle $\beta$ exceeds 0.1 wt. %, the following problem occurs. That is, when the polyester film that is wound in a roll after the vacuum evaporation of a ferromagnetic metal is left standing, the layer B-side surface roughness is transcribed to the ferromagnetic metal layer surface so that the surface undulation of the ferromagnetic metal layer becomes great. As a result, the electromagnetic conversion property of digital videotapes deteriorates, and dropouts increase. Thus, neither the average particle size of the fine particle $\beta$ exceeding 500 nm nor the content of the fine particle $\beta$ exceeding 0.1 wt. % is preferable. There is a similar tendency if the SRz value of the layer B-side surface exceeds 500 nm.

If the average particle size of the fine particle $\alpha$ is less than 50 nm or the content of the fine particle $\alpha$ is less than 0.1 wt. %, the following problem occurs. That is, while the produced polyester film slit into a length of 10,000 m or greater is left standing as a product, the projection configuration formed on the layer B-side surface of the polyester film by the fine particle $\beta$ is transcribed to the surface A-side layer particularly in a winding core portion near the bobbin, so that dented deformations are formed on the layer A-side surface. After the vacuum evaporation, dented deformations remain on the ferromagnetic metal thin film. As a result, the electromagnetic conversion property of digital videotapes deteriorates, resulting in increased dropouts. Thus, neither the average particle size of the fine particle $\alpha$ being less than 50 nm nor the content of the fine particle $\alpha$ being less than 0.1 wt. % is preferable. There is a similar tendency if the SRa value of the layer B-side surface is less than 10 nm. If the average particle size of the fine particle $\alpha$ exceeds 250 nm or the content of the fine particle $\alpha$ exceeds 1 wt. %, the layer B-side surface roughness inconveniently increases. Therefore, while the produced polyester film slit into a length of 10,000 m or greater is left standing as a product, the layer B-side surface roughness of the polyester film is transcribed to the layer A-side surface, so that the surface undulation of the layer A-side surface increases. Therefore, the surface undulation of the ferromagnetic metal thin film formed by vacuum evaporation becomes great. As a result, the electromagnetic conversion property of digital videotapes deteriorates, resulting in increased dropouts. Thus, neither the average particle size of the fine particle $\alpha$ exceeding 250 nm nor the content of the fine particle $\alpha$ exceeding 1 wt. % is preferable. There is a similar tendency if the SRa value of the layer B-side surface exceeds 25 nm.

The fine particles $\alpha$, $\beta$ preferably used are, for example, particles made of inorganic compounds, such as silica, calcium carbonate, alumina, aluminum silicate, etc., or organic compounds, such as polyacrylic acid spherical particles, polystyrene spherical particles, etc., or particles formed by coating inorganic particle cores made of silica, alumina, calcium carbonate, etc., with organic macromolecules, etc. The fine particle $\alpha$ is preferably an inorganic fine particle and, particularly preferably, aluminum silicate. The fine particle $\beta$ is preferably an organic fine particle and, particularly preferably, a polystyrene particle.

The layer B may contain, besides the fine particles $\alpha$, $\beta$, a fine particle that is finer than the fine particle $\alpha$. The finer particle may be of calcium carbonate, silica, alumina, polystyrene, alumina silicate, etc. It is also possible to add different components, such as a surface active agent, an antistatic agent, various ester components, and the like, to the layer B.

In the film forming step, the slit step and the magnetic tape processing step regarding the polyester film, it is important that the slippage property of the polyester film with respect to various guide rolls and the handling characteristic of the polyester film be good. However, if a slip-facilitating layer is applied to the layer B-side surface of the polyester film in order to improve the slippage property and the handling characteristic, the following undesirable effects are caused. That is, when the polyester film is subjected to the vacuum evaporation of a ferromagnetic metal, the slip-facilitating layer is scraped against a cooling can, or deposits on the cooling can and thus stains the cooling can. As a result, heat damage occurs on the film, or stain deposits on the vacuum-deposited film, thereby causing dropouts of videotapes. Hence, it is preferable that no slip-facilitating layer be formed on the layer B-side surface by application. As the polyester film in accordance with the invention contains two kinds of fine particles, that is, the fine particles α, β, at a specific proportion in the layer B, the polyester film has good slippage property and good handling characteristic without a slip-facilitating layer formed on the layer B-side surface.

The polyester film in accordance with the invention is formed by laminating the layer A and the layer B. The thickness of the layer B is preferably 8% to 25% of the entire thickness of the film and, more preferably, 10% to 20% thereof. If the thickness of the layer B is less than 8% of the entire thickness, it becomes likely that the fine particles in the layer B and, in particular, the fine particle β, will fall apart. Thus, the thickness of the layer B being less than 8% of the entire thickness is not preferable. If the thickness of the layer B is greater than 25% of the entire thickness, the shapes of the fine particles in the layer B are likely to cause projection-like deformations in the surface A via the layer A. Thus, the thickness of the layer B being greater than 25% of the entire thickness is not preferable.

In the polyester film in accordance with the invention, it is preferable that the layer B contain 0.05 wt. % to 1 wt. % of a wax and/or a soap. A more preferable content thereof is 0.1 wt. % to 0.7 wt. %. Furthermore, it is preferable that the layer B contain 0.001 wt. % to 0.1 wt. % of a silicone compound and/or a fluorine compound. A more preferable content thereof is 0.03 wt. % to 0.08 wt. %. The wax and/or the soap and the silicone compound and/or the fluorine compound may be separately contained. However, it is more preferable that the wax and/or the soap and the silicone compound and/or the fluorine compound be contained in a combined manner. The wax used in the polyester film may be carnauba wax, whale wax, bees wax, Chinese wax, lanolin, etc. The soap used may be metal salts of fatty acids, aromatic sulfonic acids, resin acids, naphthenic acids, etc., for example, sodium salts and lithium salts of alkyl benzene sulfonic acids, and the like. If the wax or soap content is at least 0.05 wt. %, the precipitation of oligomers of polyester from the polyester film caused by a solvent remaining in the back coat is more likely to be prevented. Thus, the wax or soap content being at least 0.05 wt. % is preferable. If the wax or soap content is greater than 1 wt. %, the layer B-side surface of the polyester film becomes sticky, and the adhesion strength of the back coat layer decreases. Thus, the wax or soap content being greater than 1 wt. % is not preferable.

The layer A may also contain 0.05 wt. % to 1 wt. % of a wax and/or a soap.

The silicone compound used as described above may be polydimethyl siloxane or the like. The fluorine compound used may be polytetrafluoroethylene or the like. Preferably, the silicone compound and the fluorine compound are compounds that disperse in polyester in the form of molecules, not in the form of particles. If the content of the silicone compound and/or the fluorine compound is less than 0.01 wt. %, undesirable effects are caused as follows. That is, after the formation of a metal thin film during the production of a DVC(digital video cassette) tape, a film breakage tends to occur in a unwinding-start portion at the time of providing a DLC(diamond-like carbon) layer, or in a unwinding-start portion before the formation of a back coating, due to the blocking in a film/film portion at the side edges of the film roll product. If the content of the silicone compound and/or the fluorine compound exceeds 0.1 wt. %, undesirable effects are caused as follows. That is, the adhesion property of the layer B-side surface of the polyester film tends to deteriorate, and the back coat layer tends to peel off from the polyester film.

An example of the production method in accordance with the invention will be presented below. An increased number of layers may be provided in the polyester film. The production method in accordance with the invention is not limited to the method described below.

A polyester film in accordance with the invention may be produced in an ordinary plastic film producing process that includes melting, formation, biaxial stretching and heatset, by forming a film with the layers A, B laminated by extrusion using a co-extrusion technique, and providing a coating layer containing a fine particle on the polyester film layer A by a coating technique, and winding up the film.

More specifically, a layer A material from which particles have been removed as much as possible, and a layer B material containing the fine particle α and the fine particle β are melted and co-extruded, and the extrusion is cooled and solidified on a casting drum, thereby providing an unstretched film sheet. The unstretched film sheet is monoaxially stretched. A coating solution for providing the aforementioned coating layer on the layer A-side surface of the monoaxially stretched film sheet is prepared, and is applied to the film sheet, and is dried. After that, the film sheet is stretched and oriented in a direction perpendicular to the direction of the aforementioned monoaxial stretching, and is heat-set, thereby providing a film in accordance with the invention.

The biaxial stretching may-be performed by, for example, sequential biaxial stretching or simultaneous biaxial stretching. It is also possible to re-stretch the film in either the machine direction or the transverse direction or in both the machine and transverse directions before heat-setting the film, in order to enhance the mechanical strength of the film, if desired so.

As for the method of forming the coating layer, a desired coating solution is applied to the base layer film during a stage where the monoaxial stretching has been completed, as described above. The application method may be any one of a doctor blade method, a gravure method, a reverse roll method, a metering bar method, and the like.

The polyester film of the invention is suitable as a base film of a magnetic recording medium. In particular, when used for a digital videotape, the polyester film provides excellent results. Furthermore, the polyester film is also suitable for the use for a data storage tape, providing excellent results.

A magnetic recording tape in accordance with the invention is formed by providing a ferromagnetic metal thin film on the layer A-side surface of a polyester base film in accordance with the invention by vacuum evaporation. The ferromagnetic metal thin film is preferably formed from iron, cobalt, nickel or the like, or a ferromagnetic material of an alloy of any two or more of the aforementioned materials. A preferred thickness of the ferromagnetic metal thin film is 100 nm to 300 nm. As the thickness of the ferromagnetic metal thin film is as small as 100 nm to 300 nm, the ferromagnetic metal thin film surface directly reflects the base film surface configuration. It is preferable to provide a diamond-like carbon (DLC) film having a thickness of about 5 nm to 20 nm as a protective layer on the ferromagnetic metal thin film for protection, and form thereon a lubricating layer having a thickness of about 2 nm to 10 nm from a fluorine-based lubricant. Preferably, the magnetic recording tape in accordance with the invention has, on the layer B-side surface of the base film, a back coat layer for securing a durability and a running characteristic with respect to various guides, pins and the like that are provided in a videotape recorder. The back coat layer is formed by applying a solution that contains a solid fine particle and a binder and that contains various additives in accordance with needs. As the solid fine particle, carbon black may be suitably used. As the binder, a polyurethane resin may be suitably used. As the additives, silicone and the like may be suitably used. However, none of the solid fine particle, the binder and the additives is particularly limited. The thickness of the back coat layer is about 0.3 μm to 1.5 μm.

<Measurement Methods>

(1) SRa Value, SRz Value SRa and SRz values were measured using an optical probe type (critical angle focus error detection type) three-dimensional surface roughness meter (ET-30HK) by Kosaka Laboratory Ltd.

SRa value: center-line surface average roughness corresponding to Ra definened by JIS B0601.

SRz value: ten-point average surface roughness corresponding to Rz definened by JIS B0601. Using, as a reference plane, an average plane of portions obtained by removing a reference area portion from a roughness curved surface, the distance between a mean value of the altitudes of the highest to the fifth highest peaks and a mean value of the depths of the deepest to the fifth deepest troughs is inputted and converted to obtain an SRz value.

A measurement surface of each test piece was subjected to Al vapor deposition.

The measurement direction was set to the transverse direction. The cutoff value was set to 0.08 mm. The measurement was performed with a measurement length 0.1 mm to 0.25 mm, a feed pitch of 0.2 μm, and a measurement speed of 20 μm/s. Measurement was effected along 100 lines. The unit of measurement was set to nm.

(2) Electromagnetic Conversion Property, Durability

Properties of magnetic recording tapes in accordance with the invention were evaluated by observing dropouts (DO) through the use of a commercially available combination camera/digital videotape recorder (DVC). Of the prepared DVC tapes, 20 tapes produced from surface portions of base film rolls and 20 tapes produced from winding core portions of the base film rolls were selected. Each of the DVC tapes was subjected to recording by the commercially available combination camera/digital videotape recorder. The number of block-shaped mosaics appearing on a screen during a one-minute reproduction from each DVC tape was counted. A mean value of the counts for the 20 tapes was determined as a DO measurement. As for the DO, an initial property subsequent to the production of the tapes and a property after the tape running was repeated 100 times were measured at a normal temperature and a normal humidity (25° C., 60% RH). Smaller DO values indicate better properties of the tapes.

Next, the invention will be described with reference to examples.

EXAMPLE 1

A material A prepared as a mixture of a polyethylene terephthalate containing substantially no inert particle and 0.02 wt. % of silica having an average particle size of 60 nm, and a material B prepared as a mixture of a polyethylene terephthalate containing substantially no inert particle, 0.36 wt. % of aluminum silicate having an average particle size of 190 nm, and 0.05 wt .% of polystyrene spherical particles having a particle size of 320 nm are co-extruded at a thickness ratio of 5:1. The extrusion was stretched to three times in the machine direction at 110° C. by a roll stretching method.

After the process of stretching in the machine direction, an aqueous solution containing the following components was applied to the layer-A side surface, thereby forming a coating layer.

| | |
|---|---|
| Methylcellulose | 0.10 wt. % |
| Water-soluble polyester | 0.30 wt. % |
| Aminoethyl silane coupling agent | 0.01 wt. % |
| Very fine silica of 12 nm in average particle size | 0.03 wt. % |
| Solid fraction concentration | 20 mg/m² |

After that, the sheet was stretched to 3.3 times in the transverse direction by a stenter, and was subjected to a heat treatment at 200° C., and then was wound on an intermediate spool. After that, the sheet was slit into reduced widths by a slitter, and each slit was wound on a cylindrical core into the shape of a roll, thereby producing a rolled co-extruded polyester film having a thickness of 6.3 μm and a length of 15,000 m.

A cobalt-oxygen thin film was formed on the layer A-side surface of the polyester film so as to have a film thickness of 110 nm by vacuum evaporation. Next, a diamond-like carbon film was formed to a thickness of 10 nm on the cobalt-oxygen thin film layer by a sputtering method. Then, a fluorine-containing carboxylic acid lubricant was placed to a thickness of 4 nm on the diamond-like carbon film. Subsequently, a back coat layer containing carbon black, polyurethane and silicone was provided so as to have a thickness of 400 nm. The film was slit into a width of 6.35 mm by a slitter. Each slit was wound on a reel, thereby preparing a magnetic recording tape.

Properties of the co-extruded polyester films and the magnetic recording tapes produced are shown in Tables 1 and 2.

The SRa value and the SRz value of the layer B-side surface of the co-extruded polyester film were 20 nm and 300 nm, respectively.

EXAMPLE 2

Co-extruded polyester film rolls having a film thickness of 4.2 μm and a length of 15,000 m were prepared in substantially the same manner as in Example 1, except that polyethylene terephthalate used in the base film production in Example 1 was replaced by polyethylene-2,6-naphthalate, and that the machine-direction stretching temperature and ratio were changed to 135° C. and 5.0 times and the transverse stretching temperature and ratio were changed to 135° C. and 6.0 times, and that transverse stretching to 12 times at 160° C. was performed.

As in Example 1, magnetic recording tapes having a width of 6.35 mm were produced. Properties of the co-extruded polyester films and the magnetic recording tapes thus produced are shown in Tables 1 and 2.

The SRa value and the SRz value of the layer B-side surface of the co-extruded polyester film were 18 nm and 270 nm, respectively.

EXAMPLE 3

Co-extruded polyester film rolls having a film thickness of 4.2 μm and a length of 15,000 m were prepared in substantially the same manner as in Example 2, except that silica contained in the material A in the base film production in Example 2 was removed. Magnetic recording tapes having a width of 6.35 mm were produced as in Example 2. Properties of the co-extruded polyester films and the magnetic recording tapes thus produced are shown in Tables 1 and 2.

The SRa value and the SRz value of the layer B-side surface of the co-extruded polyester film were 20 nm and 300 nm, respectively.

EXAMPLE 4

Co-extruded polyester film rolls having a film thickness of 6.3 μm and a length of 15,000 m were prepared in substantially the same manner as in Example 1, except that the content of aluminum silicate contained in the material B used in the base film production as in Example 1 was changed to 0.20 wt. %. Magnetic recording tapes having a width of 6.35 mm were produced as in Example 1. Properties of the co-extruded polyester films and the magnetic recording tapes thus produced are shown in Tables 1 and 2.

The SRa value and the SRz value of the layer B-side surface of the co-extruded polyester film were 17 nm and 250 nm, respectively.

EXAMPLE 5

Co-extruded polyester film rolls having a film thickness of 6.3 μm and a length of 15,000 m were prepared in substantially the same manner as in Example 1, except that the content of aluminum silicate contained in the material B used in the base film production as in Example 1 was changed to 0.80 wt. %. Magnetic recording tapes having a width of 6.35 mm were produced as in Example 1. Properties of the co-extruded polyester films and the magnetic recording tapes thus produced are shown in Tables 1 and 2.

The SRa value and the SRz value of the layer B-side surface of the co-extruded polyester film were 23 nm and 345 nm, respectively.

EXAMPLE 6

Co-extruded polyester film rolls having a film thickness of 6.3 μm and a length of 15,000 m were prepared in substantially the same manner as in Example 1, except that the average particle size and the content of aluminum silicate contained in the material B used in the base film production as in Example 1 were changed to 70 nm and 0.40 wt. %, respectively. Magnetic recording tapes having a width of 6.35 mm were produced as in Example 1. Properties of the co-extruded polyester films and the magnetic recording tapes thus produced are shown in Tables 1 and 2.

The SRa value and the SRz value of the layer B-side surface of the co-extruded polyester film were 22 nm and 340 nm, respectively.

EXAMPLE 7

Co-extruded polyester film rolls having a film thickness of 6.3 μm and a length of 15,000 m were prepared in substantially the same manner as in Example 1, except that the average particle size and the content of aluminum silicate contained in the material B used in the base film production as in Example 1 were changed to 220 nm and 0.15 wt. %, respectively. Magnetic recording tapes having a width of 6.35 mm were produced as in Example 1. Properties of the co-extruded polyester films and the magnetic recording tapes thus produced are shown in Tables 1 and 2.

The SRa value and the SRz value of the layer B-side surface of the co-extruded polyester film were 24 nm and 380 nm, respectively.

EXAMPLE 8

Co-extruded polyester film rolls having a film thickness of 6.3 μm and a length of 15,000 m were prepared in substantially the same manner as in Example 1, except that the average particle size and the content of polystyrene spherical particles contained in the material B used in the base film production as in Example 1 were changed to 270 nm and 0.02 wt. %, respectively. Magnetic recording tapes having a width of 6.35 mm were produced as in Example 1. Properties of the co-extruded polyester films and the magnetic recording tapes thus produced are shown in Tables 1 and 2.

The SRa value and the SRz value of the layer B-side surface of the co-extruded polyester film were 16 nm and 220 nm, respectively.

EXAMPLE 9

Co-extruded polyester film rolls having a film thickness of 6.3 μm and a length of 15,000 m were prepared in substantially the same manner as in Example 1, except that the average particle size and the content of polystyrene spherical particles contained in the material B used in the base film production as in Example 1 were changed to 270 nm and 0.08 wt. %, respectively. Magnetic recording tapes having a width of 6.35 mm were produced as in Example 1. Properties of the co-extruded polyester films and the magnetic recording tapes thus produced are shown in Tables 1 and 2.

The SRa value and the SRz value of the layer B-side surface of the co-extruded polyester film were 18 nm and 240 nm, respectively.

EXAMPLE 10

Co-extruded polyester film rolls having a film thickness of 6.3 μm and a length of 15,000 m were prepared in substantially the same manner as in Example 1, except that the average particle size and the content of polystyrene spherical particles contained in the material B used in the base film production as in Example 1 were changed to 450 nm and 0.02 wt. %, respectively. Magnetic recording tapes having a width of 6.35 mm were produced as in Example 1. Properties of the co-extruded polyester films and the magnetic recording tapes thus produced are shown in Tables 1 and 2.

The SRa value and the SRz value of the layer B-side surface of the co-extruded polyester film were 24 nm and 340 nm, respectively.

EXAMPLE 11

Co-extruded polyester film rolls having a film thickness of 6.3 μm and a length of 15,000 m were prepared in substantially the same manner as in Example 1, except that the average particle size and the content of polystyrene spherical particles contained in the material B used in the base film production as in Example 1 were changed to 320 nm and 0.09 wt. %, respectively. Magnetic recording tapes having a width of 6.35 mm were produced as in Example 1. Properties of the co-extruded polyester films and the magnetic recording tapes thus produced are shown in Tables 1 and 2.

The SRa value and the SRz value of the layer B-side surface of the co-extruded polyester film were 22 nm and 320 nm, respectively.

EXAMPLE 12

Co-extruded polyester film rolls having a film thickness of 6.3 μm and a length of 15,000 m were prepared in substantially the same manner as in Example 1, except that 0.4 wt. % of carnauba wax was added to the material B used in the base film production in Example 1. Magnetic recording tapes having a width of 6.35 mm were produced as in Example 1. No oligomer stain was observed on a cooling can after the vapor deposition. Properties of the co-extruded polyester films and the magnetic recording tapes thus produced are shown in Tables 1 and 2.

DO was observed at the normal temperature and the normal humidity (25° C., 60% RH) after the magnetic recording tapes were left standing at a high temperature (60° C.) for 10 days. There was no DO increase.

The SRa value and the SRz value of the layer B-side surface of the co-extruded polyester film were 20 nm and 300 nm, respectively.

EXAMPLE 13

Co-extruded polyester film rolls having a film thickness of 6.3 μm and a length of 15,000 m were prepared in substantially the same manner as in Example 1, except that 0.03 wt. % of carnauba wax was added to the material B used in the base film production in Example 1. Magnetic recording tapes having a width of 6.35 mm were produced as in Example 1. Properties of the co-extruded polyester films and the magnetic recording tapes thus produced are shown in Tables 1 and 2.

DO was observed at the normal temperature and the normal humidity (25° C., 60% RH) after the magnetic recording tapes were left standing at a high temperature (60° C.) for 10 days. It was found that the initial DO increased to 3/minutes. Oligomer foreign material was found in the back coat layer.

The SRa value and the SRz value of the layer B-side surface of the co-extruded polyester film were 20 nm and 300 nm, respectively.

EXAMPLE 14

Co-extruded polyester film rolls having a film thickness of 6.3 μm and a length of 15,000 m were prepared in substantially the same manner as in Example 1, except that 1.5 wt. % of carnauba wax was added to the material B used in the base film production in Example 1. Magnetic recording tapes having a width of 6.35 mm were produced as in Example 1. No oligomer stain was observed on a cooling can after the vapor deposition. Properties of the co-extruded polyester films and the magnetic recording tapes thus produced are shown in Tables 1 and 2.

DO was observed at the normal temperature and the normal humidity (25° C., 60% RH) after the magnetic recording tapes were left standing at a high temperature (60° C.) for 10 days. It was found that the initial DO increased to 5/minutes. Partial peeling was found in the back coat layer.

The SRa value and the SRz value of the layer B-side surface of the co-extruded polyester film were 20 nm and 300 nm, respectively.

EXAMPLE 15

Co-extruded polyester film rolls having a film thickness of 6.3 μm and a length of 15,000 m were prepared in substantially the same manner as in Example 1, except that 0.05 wt. % of silicone oil was added to the material B used in the base film production in Example 1. Magnetic recording tapes having a width of 6.35 mm were produced as in Example 1. According to the related art, there are some cases where after the formation of a metal thin film layer, the blocking in a film/film portion at the side edges of the fill roll product occurs and the film breaks in a unwinding-start portion at the time of providing a DLC layer, or in a unwinding-start portion before the formation of a back coating. In this example, such a problem did not occur at all. Properties of the co-extruded polyester films and the magnetic recording tapes thus produced are shown in Tables 1 and 2.

The SRa value and the SRz value of the layer B-side surface of the co-extruded polyester film were 20 nm and 300 nm, respectively.

EXAMPLE 16

Co-extruded polyester film rolls having a film thickness of 6.3 μm and a length of 15,000 m were prepared in substantially the same manner as in Example 1, except that 0.0008 wt. % of silicone oil was added to the material B used in the base film production in Example 1. Magnetic recording tapes having a width of 6.35 mm were produced as in Example 1. After the formation of a metal thin film layer, the blocking in a film/film portion at the side edges of the film roll product slightly occurred in a unwinding-start portion at the time of providing a DLC layer. However, the films did not break, but were successfully formed into tapes. Properties of the co-extruded polyester films and the magnetic recording tapes thus produced are shown in Tables 1 and 2.

The SRa value and the SRz value of the layer B-side surface of the co-extruded polyester film were 20 nm and 300 nm, respectively.

EXAMPLE 17

Co-extruded polyester film rolls having a film thickness of 6.3 μm and a length of 15,000 m were prepared in substantially the same manner as in Example 1, except that 0.15 wt. % of silicone oil was added to the material B used in the base film production in Example 1. Magnetic recording tapes having a width of 6.35 mm were produced as in Example 1. Properties of the co-extruded polyester films and the magnetic recording tapes thus produced are shown in Tables 1 and 2. Observation of a DVC tape that had been run 100 times showed partial peeling of the back coat layer.

The SRa value and the SRz value of the layer B-side surface of the co-extruded polyester film were 20 nm and 300 nm, respectively.

EXAMPLE 18

Co-extruded polyester film rolls having a film thickness of 6.3 μm and a length of 15,000 m were prepared in substantially the same manner as in Example 1, except that 0.4 wt. % of carnauba wax and 0.05 wt. % of silicone oil were added to the material B used in the base film production in Example 1. Magnetic recording tapes having a width of 6.35 mm were produced as in Example 1. No oligomer stain was observed on a cooling can after the vapor deposition. According to the related art, there are some cases where after the formation of a metal thin film layer, the blocking in a film/film portion at the side edges of the film roll product occurs and the film breaks in a unwinding-start portion at the time of providing a DLC layer, or in a unwinding-start portion before the formation of a back coating. In this example, such a problem did not occur at all. Properties of the co-extruded polyester films and the magnetic recording tapes thus produced are shown in Tables 1 and 2. DO was observed at the normal temperature and the normal humidity (25° C., 60% RH) after the magnetic recording tapes were left standing at a high temperature (60° C.) for 10 days. No increase in DO was observed.

The SRa value and the SRz value of the layer B-side surface of the co-extruded polyester film were 20 nm and 300 nm, respectively.

COMPARATIVE EXAMPLE 1

Co-extruded polyester film rolls having a film thickness of 6.3 μm and a length of 15,000 m were prepared in substantially the same manner as in Example 1, except that the solid fraction concentration of the aqueous solution coating in the base film production as in Example 1 was set to 10 mg/m². Magnetic recording tapes having a width of 6.35 mm were produced. Properties of the co-extruded polyester films and the magnetic recording tapes thus produced are shown in Tables 1 and 2.

The SRa value and the SRz value of the layer B-side surface of the co-extruded polyester film were 20 nm and 300 nm, respectively.

COMPARATIVE EXAMPLE 2

Co-extruded polyester film rolls having a film thickness of 6.3 μm and a length of 15,000 m were prepared in substantially the same manner as in Example 1, except that the methylcellulose concentration in the coating aqueous solution used in the base film production as in Example 1 was set to 0.15 wt. %. Magnetic recording tapes having a width of 6.35 mm were produced. Properties of the co-extruded polyester films and the magnetic recording tapes thus produced are shown in Tables 1 and 2.

The SRa value and the SRz value of the layer B-side surface of the co-extruded polyester film were 20 nm and 300 nm, respectively.

COMPARATIVE EXAMPLE 3

Co-extruded polyester film rolls having a film thickness of 6.3 μm and a length of 15,000 m were prepared in substantially the same manner as in Example 1, except that the very fine silica concentration in the coating aqueous solution used in the base film production as in Example 1 was set to 0.02 wt. %. Magnetic recording tapes having a width of 6.35 mm were produced. Properties of the co-extruded polyester films and the magnetic recording tapes thus produced are shown in Tables 1 and 2.

The SRa value and the SRz value of the layer B-side surface of the co-extruded polyester film were 20 nm and 300 nm, respectively.

COMPARATIVE EXAMPLE 4

Co-extruded polyester film rolls having a film thickness of 6.3 μm and a length of 15,000 m were prepared in substantially the same manner as in Example 1, except that the average particle size of silica contained in the material A used in the base film production as in Example 1 was changed to 90 nm. Magnetic recording tapes having a width of 6.35 mm were produced. Properties of the co-extruded polyester films and the magnetic recording tapes thus produced are shown in Tables 1 and 2.

The SRa value and the SRz value of the layer B-side surface of the co-extruded polyester film were 20 nm and 300 nm, respectively.

COMPARATIVE EXAMPLE 5

Co-extruded polyester film rolls having a film thickness of 6.3 μm and a length of 15,000 m were prepared in substantially the same manner as in Example 1, except that the particle size of aluminum silicate contained in the material B used in the base film production as in Example 1 was set to 40 nm. Magnetic recording tapes having a width of 6.35 mm were produced. Properties of the co-extruded polyester films and the magnetic recording tapes thus produced are shown in Tables 1 and 2.

The SRa value and the SRz value of the layer B-side surface of the co-extruded polyester film were 8 nm and 280 nm, respectively.

COMPARATIVE EXAMPLE 6

Co-extruded polyester film rolls having a film thickness of 6.3 μm and a length of 15,000 m were prepared in substantially the same manner as in Example 1, except that the content of aluminum silicate contained in the material B used in the base film production as in Example 1 was changed to 0.07 wt. %. Magnetic recording tapes having a width of 6.35 mm were produced. Properties of the co-extruded polyester films and the magnetic recording tapes thus produced are shown in Tables 1 and 2.

The SRa value and the SRz value of the layer B-side surface of the co-extruded polyester film were 8 nm and 280 nm, respectively.

COMPARATIVE EXAMPLE 7

Co-extruded polyester film rolls having a film thickness of 6.3 μm and a length of 15,000 m were prepared in substantially the same manner as in Example 1, except that the particle size of aluminum silicate contained in the material B used in the base film production as in Example 1 was changed to 270 nm. Magnetic recording tapes having a width of 6.35 mm were produced. Properties of the co-extruded polyester films and the magnetic recording tapes thus produced are shown in Tables 1 and 2.

The SRa value and the SRz value of the layer B-side surface of the co-extruded polyester film were 30 nm and 310 nm, respectively.

COMPARATIVE EXAMPLE 8

Co-extruded polyester film rolls having a film thickness of 6.3 μm and a length of 15,000 m were prepared in substantially the same manner as in Example 1, except that the content of aluminum silicate contained in the material B used in the base film production as in Example 1 was changed to 1.2 wt. %. Magnetic recording tapes having a width of 6.35 mm were produced. Properties of the co-extruded polyester films and the magnetic recording tapes thus produced are shown in Tables 1 and 2.

The SRa value and the SRz value of the layer B-side surface of the co-extruded polyester film were 31 nm and 320 nm, respectively.

COMPARATIVE EXAMPLE 9

Preparation of co-extruded polyester film rolls having a film thickness of 6.3 μm and a length of 15,000 m was attempted in substantially the same manner as in Example 1, except that the particle size of polystyrene spherical particles contained in the material B used in the base film production as in Example 1 was changed to 210 nm. However, when the film sheet was slit, longitudinal wrinkles were formed in about a half the entire width of the slit. The production of magnetic recording tapes was cancelled since the production of magnetic recording tape in substantially the same manner as in Example 1 was expected to result in a considerable reduction in yield. Properties of the co-extruded polyester films thus produced are shown in Table 1.

The SRa value and the SRz value of the layer B-side surface of the co-extruded polyester film were 24 nm and 170 nm, respectively.

COMPARATIVE EXAMPLE 10

Preparation of co-extruded polyester film rolls having a film thickness of 6.3 μm and a length of 15,000 m was attempted in substantially the same manner as in Example 1, except that the content of polystyrene spherical particles contained in the material B used in the base film production as in Example 1 was changed to 0.008 wt. %. However, when the film sheet was slit, longitudinal wrinkles were formed in about two thirds of the entire width of the slit. The production of magnetic recording tapes was cancelled since the production of magnetic recording tape in substantially the same manner as in Example 1 was expected to result in a considerable reduction in yield. Properties of the co-extruded polyester films thus produced are shown in Table 1.

The SRa value and the SRz value of the layer B-side surface of the co-extruded polyester film were 15 nm and 150 nm, respectively.

COMPARATIVE EXAMPLE 11

Co-extruded polyester film rolls having a film thickness of 6.3 μm and a length of 15,000 m were prepared in substantially the same manner as in Example 1, except that the particle size of polystyrene spherical particles contained in the material B used in the base film production as in Example 1 was changed to 550 nm. Magnetic recording tapes having a width of 6.35 mm were produced. Properties of the co-extruded polyester films and the magnetic recording tapes thus produced are shown in Tables 1 and 2.

The SRa value and the SRz value of the layer B-side surface of the co-extruded polyester film were 21 nm and 510 nm, respectively.

COMPARATIVE EXAMPLE 12

Co-extruded polyester film rolls having a film thickness of 6.3 μm and a length of 15,000 m were prepared in substantially the same manner as in Example 1, except that the content of polystyrene spherical particles contained in the material B used in the base film production as in Example 1 was changed to 0.15 wt. %. Magnetic recording tapes having a width of 6.35 mm were produced. Properties of the co-extruded polyester films and the magnetic recording tapes thus produced are shown in Tables 1 and 2.

The SRa value and the SRz value of the layer B-side surface of the co-extruded polyester film were 23 nm and 530 nm, respectively.

TABLE 1

| | Properties of Polyester Films | | | | |
|---|---|---|---|---|---|
| | Layer A | | Layer B | | |
| | | | Fine particle α | | Fine particle β |
| | SRa nm | SRz nm | Particle size (nm) | Content (wt. %) | Particle size (nm) | Content (wt. %) |
|---|---|---|---|---|---|---|
| Example 1 | 3 | 30 | 190 | 0.36 | 320 | 0.05 |
| Example 2 | 4 | 35 | 190 | 0.36 | 320 | 0.05 |
| Example 3 | 3 | 30 | 190 | 0.36 | 320 | 0.05 |
| Example 4 | 3 | 30 | 190 | 0.20 | 320 | 0.05 |
| Example 5 | 3 | 30 | 190 | 0.80 | 320 | 0.05 |
| Example 6 | 3 | 30 | 70 | 0.40 | 320 | 0.05 |
| Example 7 | 3 | 30 | 220 | 0.15 | 320 | 0.05 |
| Example 8 | 3 | 30 | 190 | 0.36 | 270 | 0.02 |
| Example 9 | 3 | 30 | 190 | 0.36 | 450 | 0.08 |
| Example 10 | 3 | 30 | 190 | 0.36 | 320 | 0.02 |
| Example 11 | 3 | 30 | 190 | 0.36 | 320 | 0.09 |
| Example 12 | 3 | 30 | 190 | 0.36 | 320 | 0.05 |
| Example 13 | 3 | 30 | 190 | 0.36 | 320 | 0.05 |
| Example 14 | 3 | 30 | 190 | 0.36 | 320 | 0.05 |
| Example 15 | 3 | 30 | 190 | 0.36 | 320 | 0.05 |
| Example 16 | 3 | 30 | 190 | 0.36 | 320 | 0.05 |
| Example 17 | 3 | 30 | 190 | 0.36 | 320 | 0.05 |
| Example 18 | 3 | 30 | 190 | 0.36 | 320 | 0.05 |
| Comparative Example 1 | 1 | 28 | 190 | 0.36 | 320 | 0.05 |
| Comparative Example 2 | 6 | 30 | 190 | 0.36 | 320 | 0.05 |
| Comparative Example 3 | 3 | 8 | 190 | 0.36 | 320 | 0.05 |
| Comparative Example 4 | 4 | 55 | 190 | 0.36 | 320 | 0.05 |
| Comparative Example 5 | 3 | 30 | 40 | 0.36 | 320 | 0.05 |
| Comparative Example 6 | 3 | 30 | 190 | 0.07 | 320 | 0.05 |
| Comparative Example 7 | 3 | 30 | 270 | 0.36 | 320 | 0.05 |
| Comparative Example 8 | 3 | 30 | 190 | 1.20 | 320 | 0.05 |
| Comparative Example 9 | 3 | 30 | 190 | 0.36 | 210 | 0.05 |
| Comparative Example 10 | 3 | 30 | 190 | 0.36 | 320 | 0.05 |
| Comparative Example 11 | 3 | 30 | 190 | 0.36 | 550 | 0.05 |
| Comparative Example 12 | 3 | 30 | 190 | 0.36 | 320 | 0.15 |

TABLE 2

Dropout Property of Magnetic Tapes

| | Tape Produced from Surface Portion of Roll | | Tape Produced from Core Portion of Roll | |
|---|---|---|---|---|
| | Initial (number/min.) | After 100 runs (number/min.) | Initial (number/min.) | After 100 runs (number/min.) |
| Example 1 | 0 | 1 | 0 | 1 |
| Example 2 | 1 | 1 | 1 | 2 |
| Example 3 | 0 | 0 | 0 | 1 |
| Example 4 | 4 | 5 | 4 | 5 |
| Example 5 | 5 | 6 | 6 | 7 |
| Example 6 | 7 | 9 | 8 | 10 |
| Example 7 | 5 | 6 | 5 | 6 |
| Example 8 | 1 | 1 | 2 | 2 |
| Example 9 | 4 | 5 | 5 | 6 |
| Example 10 | 6 | 7 | 6 | 7 |
| Example 11 | 4 | 6 | 4 | 6 |
| Example 12 | 0 | 1 | 0 | 1 |
| Example 13 | 0 | 1 | 0 | 1 |
| Example 14 | 0 | 1 | 0 | 1 |
| Example 15 | 0 | 1 | 0 | 1 |
| Example 16 | 0 | 1 | 0 | 1 |
| Example 17 | 0 | 8 | 0 | 8 |
| Example 18 | 0 | 0 | 0 | 0 |
| Comparative Example 1 | 0 | 10 | 1 | 12 |
| Comparative Example 2 | 15 | 16 | 16 | 18 |
| Comparative Example 3 | 0 | 11 | 1 | 13 |
| Comparative Example 4 | 16 | 17 | 17 | 17 |
| Comparative Example 5 | 7 | 9 | 23 | 25 |
| Comparative Example 6 | 8 | 9 | 24 | 25 |
| Comparative Example 7 | 14 | 15 | 18 | 20 |
| Comparative Example 8 | 12 | 13 | 13 | 15 |
| Comparative Example 9 | — | — | — | — |
| Comparative Example 10 | — | — | — | — |
| Comparative Example 11 | 16 | 17 | 21 | 25 |
| Comparative Example 12 | 14 | 18 | 16 | 20 |

As described above, the magnetic recording tapes in accordance with the invention produced using polyester films in accordance with the invention as base films formed digital videotapes with good electromagnetic conversion property achieved over the entire length of the film product, that is, the entire length from a core portion to a surface portion thereof, and with reduced dropouts and excellent durability.

What is claimed is:

1. A polyester film for a magnetic recording medium, comprising at least a polyester layer A and a polyester layer B laminated, wherein a center-line surface average roughness (SRa value) of a layer A-side surface of the film is 2 nm to 4 nm, and a ten-point average surface roughness (SRz value) of the layer A-side surface is 10 nm to 40 nm, and the layer B contains a fine particle α whose average particle size is at least 50 nm and less than 250 nm, and a fine particle β whose average particle size is at least 250 nm and less than 500 nm, and a content of the fine particle α in the layer B is 0.1 wt. % to 1 wt. %, and a content of the fine particle β in the layer B is 0.01 wt. % to 0.1 wt. %.

2. A polyester film for a magnetic recording medium according to claim 1, wherein the layer B contains 0.05 wt. % to 1 wt. % of at least one of a wax and a soap.

3. A polyester film for a magnetic recording medium according to claim 1, wherein the layer B contains 0.001 wt. % to 0.1 wt. % of at least one of a silicone compound and a fluorine compound.

4. A polyester film for a magnetic recording medium according to claim 1, wherein the layer B contains 0.05 wt. % to 1 wt. % of at least one of a wax and a soap and 0.001 wt. % to 0.1 wt. % of at least one of a silicone compound and a fluorine compound.

5. A polyester film for a magnetic recording medium according to claim 1, wherein a polyester of the film is a polyethylene terephthalate or a polyethylene-2,6-naphthalate.

6. A polyester film for a magnetic recording medium according to claim 1, wherein a layer B-side surface of the film is provided with no lubricating layer formed by application.

7. A polyester film for a magnetic recording medium according to claim 1, wherein the layer A-side surface is provided with a coating layer.

8. A polyester film for a magnetic recording medium according to claim 1, wherein the layer A-side surface is provided with a ferromagnetic metal thin film.

9. A magnetic recording tape comprising:

a polyester film described in claim 1 and a ferromagnetic metal thin film provided on a layer A-side surface of the polyester film.

10. A magnetic recording tape according to claim 9, wherein a layer B-side surface of the polyester film is provided with a back coat layer.

11. A magnetic recording tape according to claim 9, wherein the tape is a tape for a digital recording type video cassette recorder.

* * * * *